US008639575B2

(12) United States Patent
Kiveris

(10) Patent No.: US 8,639,575 B2
(45) Date of Patent: *Jan. 28, 2014

(54) AUDIENCE SEGMENT ESTIMATION

(71) Applicant: Google Inc., Mountain View, CA (US)

(72) Inventor: Raimondas Kiveris, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/731,560

(22) Filed: Dec. 31, 2012

(65) Prior Publication Data

US 2013/0124316 A1 May 16, 2013

Related U.S. Application Data

(63) Continuation of application No. 12/549,970, filed on Aug. 28, 2009, now Pat. No. 8,370,202.

(51) Int. Cl.
*G06Q 30/00* (2012.01)
(52) U.S. Cl.
USPC .................. 705/14.49; 705/14.54; 705/14.55; 705/14.73; 705/14.67

(58) Field of Classification Search
CPC . G06F 30/00; G06F 30/0251; G06F 30/0256; G06F 30/0257; G06F 30/0271; G06F 30/02777
USPC ........... 705/14.49, 14.54, 14.55, 14.67, 14.73
See application file for complete search history.

(56) References Cited

U.S. PATENT DOCUMENTS

| | | | |
|---|---|---|---|
| 6,061,658 A | 5/2000 | Chou et al. | |
| 7,698,422 B2 | 4/2010 | Vanderhook et al. | |
| 7,769,632 B2 | 8/2010 | Giraud et al. | |
| 7,979,544 B2 | 7/2011 | Cancel et al. | |
| 2005/0256951 A1 | 11/2005 | Shapira et al. | |
| 2008/0028066 A1 | 1/2008 | Berkhin et al. | |
| 2008/0222284 A1 | 9/2008 | Barua et al. | |
| 2009/0099995 A1 | 4/2009 | Tzeng | |
| 2009/0129377 A1 | 5/2009 | Chamberlain et al. | |
| 2009/0327076 A1 | 12/2009 | Sinyagin et al. | |
| 2012/0010920 A1 | 1/2012 | Yuan | |

FOREIGN PATENT DOCUMENTS

KR 2009000627 A 1/2009

*Primary Examiner* — Raquel Alvarez
(74) *Attorney, Agent, or Firm* — Fish & Richardson P.C.

(57) ABSTRACT

Methods, systems, and apparatus, including computer programs encoded on a computer storage medium, for estimating segments from key values for advertising impressions.

12 Claims, 5 Drawing Sheets

AUDIENCE SEGMENT ESTIMATION

CROSS-REFERENCE TO RELATED APPLICATIONS

This application is a continuation application of, and claims priority to, U.S. patent application Ser. No. 12/549,970, entitled Audience Segment Estimation, which was filed on Aug. 28, 2009. The disclosure of the foregoing application is incorporated herein by reference in its entirety.

BACKGROUND

This specification relates to online advertising.

The Internet provides access to a wide variety of resources, such as video and/or audio files, as well as web pages for particular subjects or particular news articles. Access to these resources has provided opportunities for advertisements to be provided with the resources. For example, web pages can include advertisement slots in which advertisements can be presented. The advertisements slots can be defined in the web page or defined for presentation with a web page.

Often publishers and/or advertisers desire information describing an audience segment for an advertisement or advertising campaign. Obtaining this information can help facilitate segment targeting and/or behavioral targeting. For example, assume a segment of users that visit a publisher site is defined by users that are interested in both i) cooking and ii) knitting. If accurate information describing the segment can be obtained, the publishers and/or advertisers can determine whether to target advertisements to only pageviews that coincide with the segment, or to target advertisements to all users that belong to the segment, or to not target to the segment at all.

Obtaining accurate segment information, however, can be time consuming, as there are often millions of log records that are required for processing.

SUMMARY

In general, one aspect of the subject matter described in this specification can be embodied in methods that include the actions of accessing, by a data processing apparatus, publisher logs including data describing past impressions delivered for pageviews for publisher sites, the data including, for each impression: a user identifier, a publisher identifier identifying a publisher, pageview value identifying a pageview, and a plurality of publisher key values of the publisher provided for the impression; generating, by the data processing apparatus, from the publisher logs publisher pageview data for each publisher, the publisher pageview data for each publisher comprising pageview records representative of pageviews that occurred during a first time period, each pageview record representing one or more pageviews associated with a user identifier and a publisher identifier pair during a second time period that occurred during the first time period, each pageview record including: a user identifier, a publisher identifier, and publisher key values provided for the impressions that occurred for the one or more pageviews represented by the pageview record; receiving, at the data processing apparatus, a segment definition for a publisher, the segment definition defining a segment by one or more publisher key values of the publisher; assigning, by the data processing apparatus, to the segment user identifiers from records that include publisher key values that satisfy the segment defined by the segment definition; determining, by the data processing apparatus, one or more segment characteristics based on the user identifiers assigned to the segment and the pageview records of the user identifiers assigned to the segment; and providing, in response to the segment definition, response data describing the one or more characteristics of the segment. Other embodiments of this aspect include corresponding systems, apparatus, and computer programs, configured to perform the actions of the methods, encoded on computer storage devices.

Another innovative aspect of the subject matter described in this specification can be embodied in methods that include the actions of generating, by a data processing apparatus, publisher pageview data for a plurality of publishers, the publisher pageview data for each publisher comprising pageview records representative of pageviews that occurred during a first time period, each pageview record representing one or more pageviews associated with a user identifier and a publisher identifier pair, each pageview record including: a user identifier, a publisher identifier identifying a publisher, and publisher key values provided for the impressions that occurred for the one or more pageviews represented by the pageview record; receiving, at the data processing apparatus, a segment definition for a publisher, the segment definition defining a segment by one or more publisher key values of the publisher; determining, by the data processing apparatus, pageviews for which publisher key values that satisfy the segment defined by the segment definition were provided for impressions; determining, by the data processing apparatus, one or more segment characteristics based on the pageviews that are determined to satisfy the segment definition; and providing, in response to the segment definition, response data describing the one or more characteristics of the segment. Other embodiments of this aspect include corresponding systems, apparatus, and computer programs, configured to perform the actions of the methods, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, the subject matter of this specification relates to estimating audience segment sizes and populating audience segments. An audience segment represents an aggregated group of prospective users that have demographic characteristics, e.g., characteristics or behavior patterns. Described herein is a segment estimation system that estimates the size of an audience segment for a web site and the quality of the audience segment. The segment estimation system uses segment definition data that defines a segment for a web site and determines, from pageview and impression data, the number of users belonging to the segment. The number of in-segment pageviews are compared to the number of in-segment and out-of-segment pageviews to determine a quality of the segment.

Depending on the size and quality of the segment, the publisher may make different targeting decisions. For example, if the segment size is large but the quality is not high, the publisher may elect to target in-segment only, i.e., target users that belong to the segment only when they are viewing a page that also belongs to the segment. If the segment size is large and the quality is high, the publisher may elect to target in-segment and out-of-segment i.e., target users that belong to the segment regardless of whether they are viewing a page that also belongs to the segment. Finally, if the segment is size is small, the publisher may elect to not target the segment.

§1.0 Example Operating Environment

Figure 1:
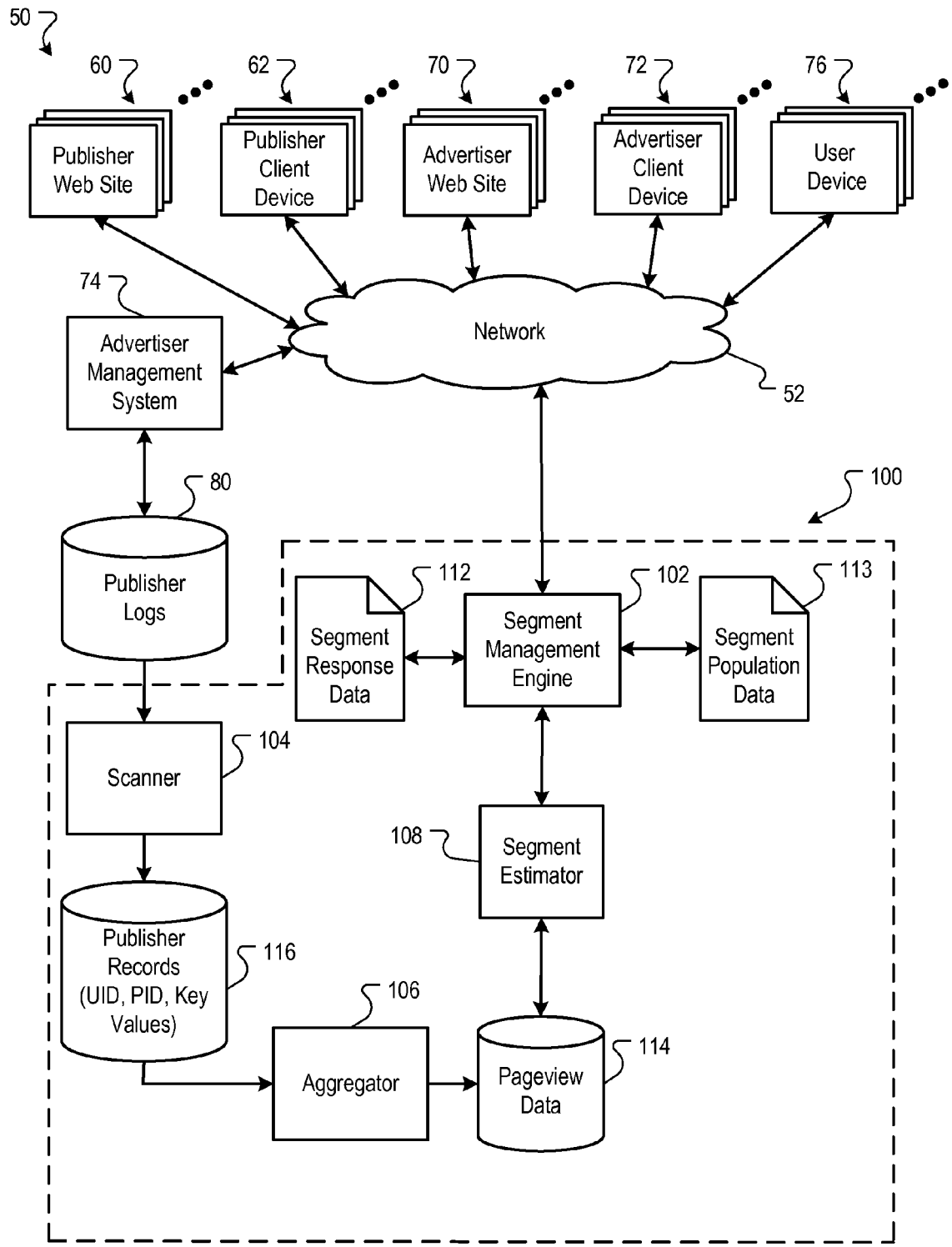
FIG. 1 is a block diagram of an environment in which a segment estimation system can be utilized.

FIG. 1 is a block diagram of an environment 50 in which segment estimation system 100 can be utilized. The environment 50 includes a computer network 52, such as a local area network (LAN), wide area network (WAN), the Internet, or a combination thereof, connecting publisher web sites 60, publisher client devices 62, advertiser web sites 70, advertiser client devices 72, an advertiser management system 74, user devices 76, and the segment estimation system 100.

Each web site 60 is one or more web page resources associated with a domain name, and each web site is hosted by one or more servers. An example web site is a collection of web pages formatted in hypertext markup language (HTML) that can contain text, graphic images, multimedia content, and programming elements, such as scripts. Each web site 60 is maintained by a publisher, e.g., an entity that manages and/or owns the web site. For brevity, the term "publisher" will also be used to refer to a web site 60 that is managed and/or owned by the publisher. Similar web sites 70 are maintained by corresponding advertisers, and the term "advertiser" will also be used to refer to a web site 70 that is managed and/or owned by an advertiser.

Publisher client devices 62, advertiser client devices 72, and user client devices 76 are electronic devices that are under the control of users and are capable of requesting and receiving data over the network 52. A client device typically includes a user application, such as a web browser, to facilitate the sending and receiving of data over the network 52, such as requesting a resource (e.g., page content) from a publisher 60 or advertiser 70. Example client devices include personal computers, mobile communication devices, and other devices that can send and receive data over the network 52.

The advertisement management system 74 can provide advertisements of the advertisers 70 for the web pages of the publishers 60. For example, publishers 60 can submit advertisement requests for one or more advertisements to the advertisement management system 74. The advertisement management system 74 responds by sending the advertisements to the requesting publishers 60 for placement on the publishers' web pages, resulting in impressions for the advertisement when the web pages are rendered with the advertisements on the user client devices 76. The advertisements can include embedded links to landing pages, e.g., pages on the advertisers' 70 websites, that a user is directed to when the user clicks an advertisement presented on a publisher web page.

The publisher logs 80 store data records describing past impressions delivered for pageviews of particular publisher sites. A pageview represents a request to load a single page of an Internet site. For each past impression, the data includes a user identifier, a publisher identifier, a pageview value, and publisher key values of the publisher provided for the particular impression. The user identifier and publisher identifier each identify the user and publisher, respectively. The pageview value identifies a particular pageview instance of a web page for a particular publisher site and on which the impression occurred. The key value is typically a tuple including the publisher identifier, a key, and a value related to a particular impression. Key values can be created or specified by publishers and may include a keyword, number, term, or phrase, and described attributes such as demographic and targeting data that may be tracked by the advertisement management system 74 and/or by each corresponding publisher 60. Examples of such attribute data include contextual data, i.e., data defined by the impression tags of the publisher, such as interests, keywords and hobbies; a user's gender, age, income level, and education level; a location (e.g., zip code, city, and/or country) of the user or client device that requested the web page; and other information that can be tracked by the advertisement management system 74 and/or by the publishers 60. Additional information, such as a time and date of the impression, can also be stored in the publisher logs 80.

In some implementations, to protect the privacy of users, the advertisement management system anonymizes the impression data for a user so that the data stored in the logs 80 cannot be associated with the user. For example, the identity of the user can be obscured or set to a unique number that is otherwise not associated with the user; and the user's addresses (if known) can be obfuscated to no more than a postal service area, such as a zip code. The logs 80 can also be encrypted to further protect user information in the event of unauthorized system access. Additional techniques to protect user privacy can also be implemented.

§2.0 Segment Estimation System

The segment estimation system 100 can estimate audience segment sizes for a site 60 using data collected in the logs 80. For example, the estimations generated by the system 100 can provide a publisher of site 60 with the knowledge to make informed decisions by allowing the publisher to view effects on segment size and quality before actually creating the audience segments.

In operation, the segment estimation system 100 facilitates the targeting of advertisements to consumers. For example, the system 100 can provide data to the advertisement management system 74 which describes one or more characteristics of a selected audience segment. The data can be used to target advertisements for future pageviews associated with user identifiers within the selected audience segment for a publisher web site 60.

The segment estimation system 100 employs the scanner 104 to access and scan the publisher logs 80. Specifically, the scanner 104 retrieves records including user identifiers, publisher identifiers, pageview values, and key values for each advertisement impression and organizes the publisher records 80 by user identifier and publisher identifier. These sorted records are stored in a publisher records data store 116. In some implementations, the scanner scans publisher logs 80 on a daily basis after all publisher logs for a particular day have been collected.

The aggregator 106 accesses the publisher records 116 and aggregates the records by user identifier/publisher identifier pairs. These aggregated records are stored in the publisher pageview data store 114 as publisher pageview data. In some implementations, the publisher pageview data for each publisher includes pageview records representative of pageviews that occurred during a first time period, e.g., a month. Each pageview record represents one or more pageviews associated with a user identifier and a publisher identifier pair during a second time period that occurred during the first time period, e.g., one day in the month. Thus, if a particular user visited a publisher during twenty different days in the one-month period, then there would be twenty records in the pageview data store 114 with corresponding user identifier and a publisher identifier pairs. Furthermore, each record includes publisher key values provided for impressions that occurred for the pageviews represented by the pageview record. Pageview records are described in more detail in FIG. 2.

The segment management engine 102 receives segment definition information for a publisher. The segment definition defines a segment by one or more publisher key values of the publisher. The segment definition is provided to the segment estimator 108, which uses pageview data 114 and segment definition information to determine one or more segment characteristics, such as the size of the segment, the number of pageviews of the segment, and/or the segment quality.

In some implementations, the segment estimator 108 assigns to the segment user identifiers from the pageview data 114 records that include publisher key values that satisfy the segment defined by the segment definition. From these assigned user identifiers, the one or more segment characteristics are determined. The determination of these characteristics is described in more detail in FIG. 2.

In some implementations, the segment estimator 108 also determines a segment quality measure. In some implementations, the quality measure is given by the following formula:

$$Q_s = f\left(\frac{N_{S+S'}}{N_S}\right)$$

Where
$Q_s$ is the quality measure;
$N_s$ is the number of in-segment pageviews; and
$N_{S+S'}$ is the total number of in-segment and out-of-segment pageviews.

The quality measures enables a publisher to judge the quality of a particular audience segment. In general, the higher the quality measure, the larger the number of impressions that can be generated by targeting to out-of-segment pageviews. For example, assume 100 users belong to a first segment for a publisher web site. The first segment is defined as users that are interested in the category of sports. These users provide 1000 in-segment pageviews, i.e., there are 1,000 total pageviews that include a publisher key value for the category of sports. For these same 100 users, there are 5,000 total pageviews in the publisher web site, i.e., in addition to the 1,000 total pageviews that include the publisher key value for the category of sports, there are an additional 4,000 pageviews for these users on the publisher web site that do not include the publisher key value for the category of sports. Also assume that another 100 users belong to a second segment for the publisher web site. The second segment is defined as users that are interested in the category of crocheting and the users provide 1,000 in-segment pageviews. For these 100 users, however, there are only 1,100 total pageviews in the publisher web site. Accordingly, the quality of the first segment is higher than the quality of the second segment.

The determined one or more segment characteristics, such as the size of the segment, the number of pageviews of the segment, the users belonging to the segment, and/or the segment quality, can be provided to the publisher in the form of segment response data 112.

The publisher can review the segment response data 112 by use of a user interface to determine whether the segment should be further analyzed and/or targeted. In some implementations, if a publisher decides to target a segment, the segment management engine 102 can generate segment population data 113 and provide the segment population data to the advertisement management system 74 for targeting. The segment population data 113 is, in some implementations, an association of user identifiers and data defining the segment. This association is used as targeting criteria. The advertisement management system 74 or the requesting publisher 60 can use the segment population data 113 to target advertisements for future pageviews associated with the user identifiers assigned to the segment, or, in some implementations, with any other users that are determined to belong to the segment when the users visit a particular publisher's site.

In some implementations, the system 100 receives or retrieves data that carries no contextual value. This data may take up storage space and add processing time in the system 100. Thus, in some implementations, the segment management engine 102 provides a mechanism to identify, label, and dispose of the wasteful data. For example, the segment management engine 102 can delete one-time unique identifiers, advertisement descriptors, customer errors, etc. One-time unique identifiers are any identifiers that identify a unique occurrence, e.g., only one single pageview for a particular user identifier during a one-month period. Advertisement descriptors are descriptors that describe size, style and/or location of an advertisement. This data is not likely to be used by clients to construct behavioral profiles for a group of users. Customer errors may apply to incorrectly constructed advertisement uniform resource locators.

The segment management engine 102 can implement strategies for managing and disposing of particular key values. For example, the segment management engine 102 can dispose of particular key value keys in advance, in accordance with a list of precluded key value types, e.g., particular advertisement descriptors. In some implementations, the engine 102 may identify low value key values and filter out these key values. For example, key values for pageviews that provided to only a small number of users in any 30-day period, e.g., less than 3, can be identified by the aggregator 106 and filtered out.

§3.0 Example Pageview Record

Figure 2:
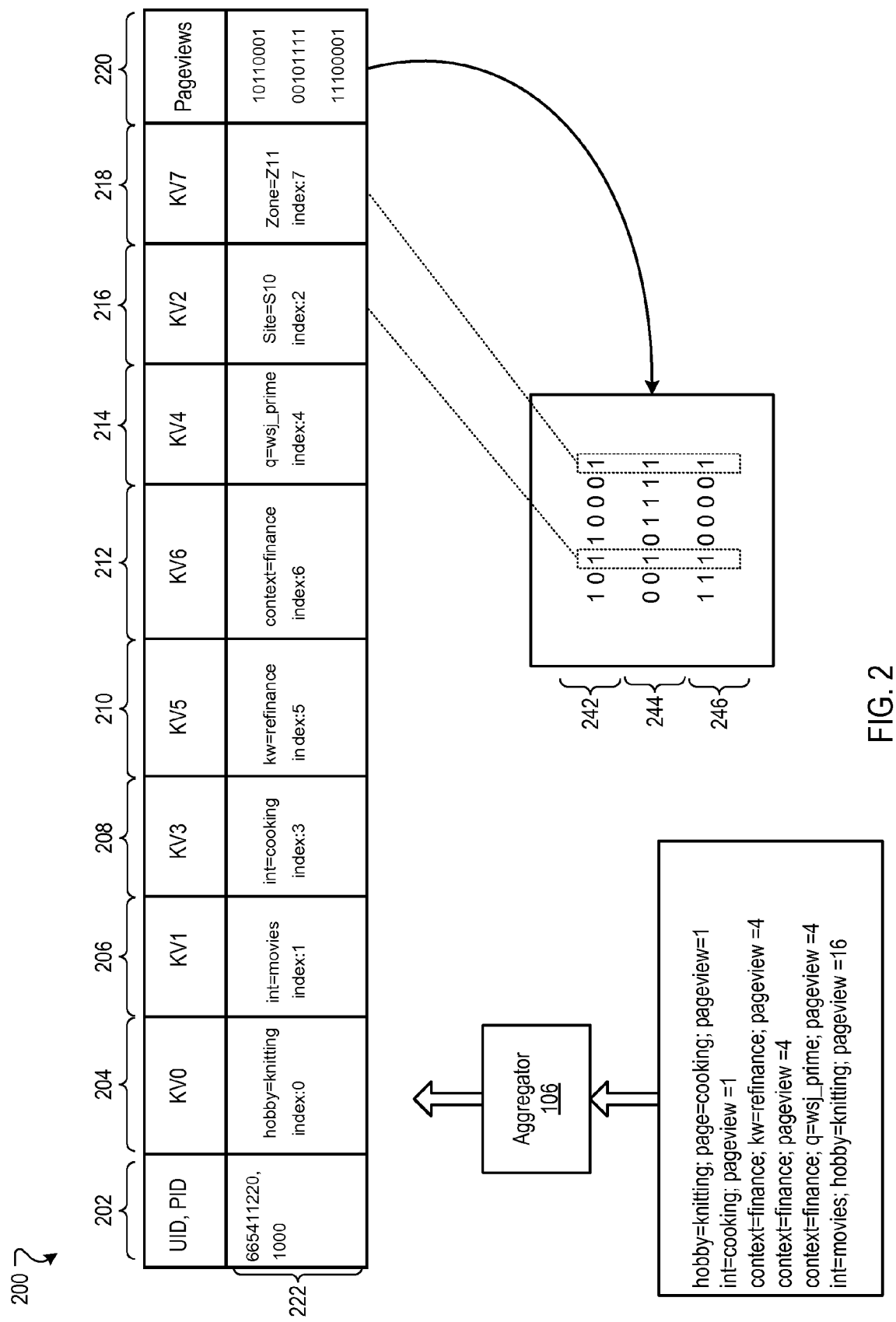
FIG. 2 is a block diagram of an example pageview record.

FIG. 2 is a block diagram of an example pageview record 200. The pageview record 200 represents a pageview/key value map that indicates which of the publisher key values were provided for impressions for a corresponding pageview. The pageview record 200 in the depicted example is in the format of record that includes a cell for each column. The cells represent aggregated publisher log data for a single user for one day. The following record 200 is provided as an example, and other data structures that associate pageviews with key values or other publisher-tracked attributes can also be used.

The example pageview record 200 is configured to optimize storage space allocation and processing efficiency. In the example implementation described below, the pageview record 200 is a compact record that stores impression data for a user identifier/publisher identifier pair for one day. Additionally, only key values that were provided for impressions for that user identifier on that day are stored in the record 200. These key values are indexed by a bit map stored in the record.

Columns for other key values that were not provided for impressions are not included in the record.

The pageview record 200 is generated by the aggregator 106 and the resulting aggregated record is stored in the pageview data store 114. In some implementations, one record is generated per user, per day for a particular webpage for up to 30 days. For example, there may exist up to 30 records for each user identifier/publisher identifier pair for 30 days of pageview data 114 for any given webpage of a publisher site. Additionally, other time periods can also be used.

In other implementations, however, the particular web pages are not tracked, and only the publisher key values are tracked. In these implementations, one record is generated per user, per day for up to 30 days. For example, there may exist up to 30 records for each user identifier/publisher identifier pair for 30 days of pageview data 114.

The depicted pageview record 200 includes a column 202 representing a user identifier/publisher identifier pair key. In some implements, this key is a tuple of the user identifier and the publisher identifier, e.g., either the user identifier or data derived from the user identifier and that is uniquely associated with the user identifier, and the publisher identifier. Columns 204, 206, 208, 210, 212, 214, 216 and 218 correspond to key values that the publisher tracks and which were provided for impressions for that user on a particular day (or some other minimum time interval). In this example, one column exists for each key value corresponding to key values that were provided for impressions for that day.

For example, suppose a publisher with the publisher identifier of "1000" served three pageviews for a user session associated with the user identifier shown in column 202. Each pageview also served one or more advertisements, and for each advertisement impression key values were provided. Assume that all pageviews were on a particular publisher site, e.g., a site identified by the value "S10", and a particular zone, e.g., a web page identified by an identifier "Z11." Example key values in publisher records for the particular publisher and particular user for one day are:

hobby=knitting; page=cooking; pageview=1
    int=cooking; pageview=1
    context=finance; kw=refinance; c=n; pageview=4
    context=finance; pageview=4
    context=finance; q=wsjprime; pageview=4
    int=movies; hobby=knitting; pageview=16

In the above example, the "pageview=<x>" key value is used in this example to aggregate impressions into pageviews. For example, there are six impressions aggregated into three pageviews (e.g., numbered 1, 4, and 16) for the publisher "1000." The pageview record 200 represents data written using the above data for the pageviews 1, 4, and 16 and the six impressions.

The column 204 include includes a key value "knitting" for the key type "hobby". The index value indicates an index in to a bit map, which will be described below. Similarly, the columns 206, 208, 210, 212 and 214 include a different key value for the publisher, i.e., column 206 includes a key value of "movies" for the key type "int" (interest); column 208 includes a key value of "cooking" for the key type "int"; column 210 includes a key value of "refinance" for the key type "keyword"; column 212 includes a key value of "finance" for the key type "context"; and column 214 includes a key value of "wsj_prime" for the key type "q" (query parameter). Column 216 includes a key value of "S10" indicating site S10. The site identifier identifies the particular web site of the publisher. Column 218 includes a key value of "Z11" indicating an advertisement zone, e.g., a particular web page.

The number of pageviews for which the key value was provided differs for each key value. For example, the key value of "knitting" occurred in two pageviews (i.e., pageviews 1 and 16, for a pageview total of 2); the key value of "movies" occurred in one pageview (i.e., pageview 16, for a pageview total of 1); etc. In some implementations, the number of pageviews can also be stored in the cell as part of a tuple value. However, use of the bit map, described below, can also be used to determine pageview counts.

Each respective field of the pageview record 200 includes a respective index value. These index values are used to index into bit maps that are stored in column 220. These index values are used to generate a pageview/key value map for each of the one or more pageviews represented by the pageview record. In some implementations, the pageview/key value map is a pageview/key value bit map having a corresponding first value (e.g., "1") in an indexed position corresponding to a respective index value of a publisher key value that was provided for an impression for the pageview, and having a corresponding second value (e.g., "0") in an indexed position corresponding to a respective index value of a publisher key value that was not provided for the impression for the pageview.

As shown in FIG. 2, the pageview/key value bit maps are indexed from left to right, with the left-most being at the index position of 0, and the right-most bit being at the index position of 7. For example, the first bit map 242 corresponding to the pageview (1); the second bit map 244 corresponds to the pageview (4); and the third bit map 246 corresponds to the pageview (16). For each bit map, column 204 corresponds to index 0, column 206 corresponds to index 1, column 216 corresponds to index 2, column 208 corresponds to index 3, column 214 corresponds to index 4, column 210 corresponds to index 5, column 212 corresponds to index 6, and column 218 corresponds to index 7. If a bit is low (i.e., 0), the pageview did not include an impression with a key value indexed by the bit. Conversely, if a bit is high (i.e., 1), the pageview did include an impression with a key value indexed by the bit. Although the columns in FIG. 2 are not in the order of the indexed values, in some implementations the columns can be arranged in an incremental order with respect to the bit map index, i.e., KV0, KV1, KV2 . . . KV7.

Note that all three impressions are for the site identifier S10 and zone identifier Z11, and that the site identifier S10 and the zone identifier Z11 are indexed by indices 2 and 7, respectively. Accordingly, the bits at indices 2 and 7 in each bit map are equal to 1.

For the bit map position at index 0, the first bit map 242 includes the value of 1, as the key value of "knitting", which is stored in column 204 and associated with the index 0, was provided for an impression with the first pageview (pageview 1). Likewise third bit map 246 includes the value of 1 at index position 0, as the key value of "knitting" was also provided for an impression with the third pageview (pageview 16). Conversely, the second bit map 244 includes the value of 0 at index position 0, as the key value of "knitting" was not provided for an impression with the second pageview (pageview 4).

The remaining bits in the bit maps 242, 244 and 246 are determined in a similar manner. Once the bit maps are generated, summing all of the respective bits at a particular index position for all bit maps generates a number that is equal to the number of pageviews for which the key value was provided.

The pageview/key value bit maps facilitate efficient searching an assignment of user identifiers to segments. In some implementations, the segment estimator 108 generates from the segment definition a segment bit mask for each pageview record. The segment bit mask has a corresponding first value (e.g., "1") in an indexed position corresponding to a respective index value of a publisher key value in the segment definition, and a corresponding second value (e.g., "0") in an indexed position corresponding to the respective index value of a publisher key value not in the segment definition. The segment estimator 108 compares the segment definition bit mask of the pageview record to each of the pageview/key value bit maps of the pageview record to determine which user identifiers belong to a segment.

For example, assume a segment is defined as users that have received impressions from the publisher 1000 with one or more of the following key values:
 ingredients=garbanzo_beans
 int=movies
 int=travel
 kw=refinance
The segment definition is thus represented by the following Boolean equation:

ingredients=garbanzo_beans OR int=movies OR
  int=travel OR kw=refinance

In some implementations, the segment definition can also specify a minimum number of pageviews during a time interval. A default definition is 1 pageview per any given day; however, the segment definition can also specify other pageview requirements, e.g., 100 pageviews for any 1 week period; or 10 pageviews for any given day, etc.

For the record 200, the segment estimator 108 will generate the following segment definition bit mask: 01000100. The bit mask is constructed by comparing the key values to the record 200. Index positions 1 and 5 are assigned the value 1 because the key values "int=movies" and "kw=refinance" are both present segment definition.

The segment estimator 108 performs bitwise operations to determine if a particular pageview meets a segment definition. For example, the segment definition bit mask is matched against the pageview bitmaps 242, 244 and 246, and two pageviews are determined to satisfy the segment definition. Accordingly, the user identifier is assigned to the segment. Additionally, two pageviews for that day are counted (i.e., the second pageview for the bit map 244, due to the presence of "refinance", and the third pageview for the bit map 246, due to the presence of "movies").

The segment estimator 108 implements the necessary Boolean algebra required by the segment definition. For example, had the segment definition required the presence of all key values (e.g., ingredients=garbanzo_beans AND int=movies AND int=travel AND kw=refinance), then none of the pageviews would have been counted.

The segment definition bit mask indexes the bits that are used in the segment definition on a per-record basis. As each record for a user identifier/publisher identify pair corresponds to only the user activity for one day at a particular publisher page (or some other minimum processing period), the corresponding pageview/key value bit maps for each user identifier/publisher identify pair record may differ. Accordingly, the segment estimator 108 generates a segment definition bit mask for each record. For example, suppose the same user for the record 200 returned to the publisher's site the next day and caused 20 pageviews to be generated. It is likely that the pageview record for the next day would have more than seven bits in the pageview/key value bit map, as additional or different key values would have been provided.

For example, assume that for all the pageviews the following day, 15 key values were provided, and those key values included "garbanzo_beans", "movies", "travel" and "refinance". The pageview/key value bit map for the next day would thus have 15 bits. Now assume also that the respective key values are indexed at positions 1, 3, 14 and 15. Given this index, the segment definition bit mask for the same segment definition would also have 15 bits, and would consist of the values "010100000000011".

The segment definition above is a relatively simple segment definition ("OR" operations) and requires only one bit mask. However, more complex segment definitions can also be used. For these more complex definitions (e.g., the use of AND operators, NAND operators, NOR operators, etc.), more than one bit mask may be required for each record.

Additionally, if particular pageview counts for a time period are required, then the segment estimator 108 can perform additional decision operations (i.e., pageview count checks for a time period) in response to the comparison of the bit mask to the bit maps to determine if a user belongs to a defined segment.

§4.0 Example Processes

Figure 3:
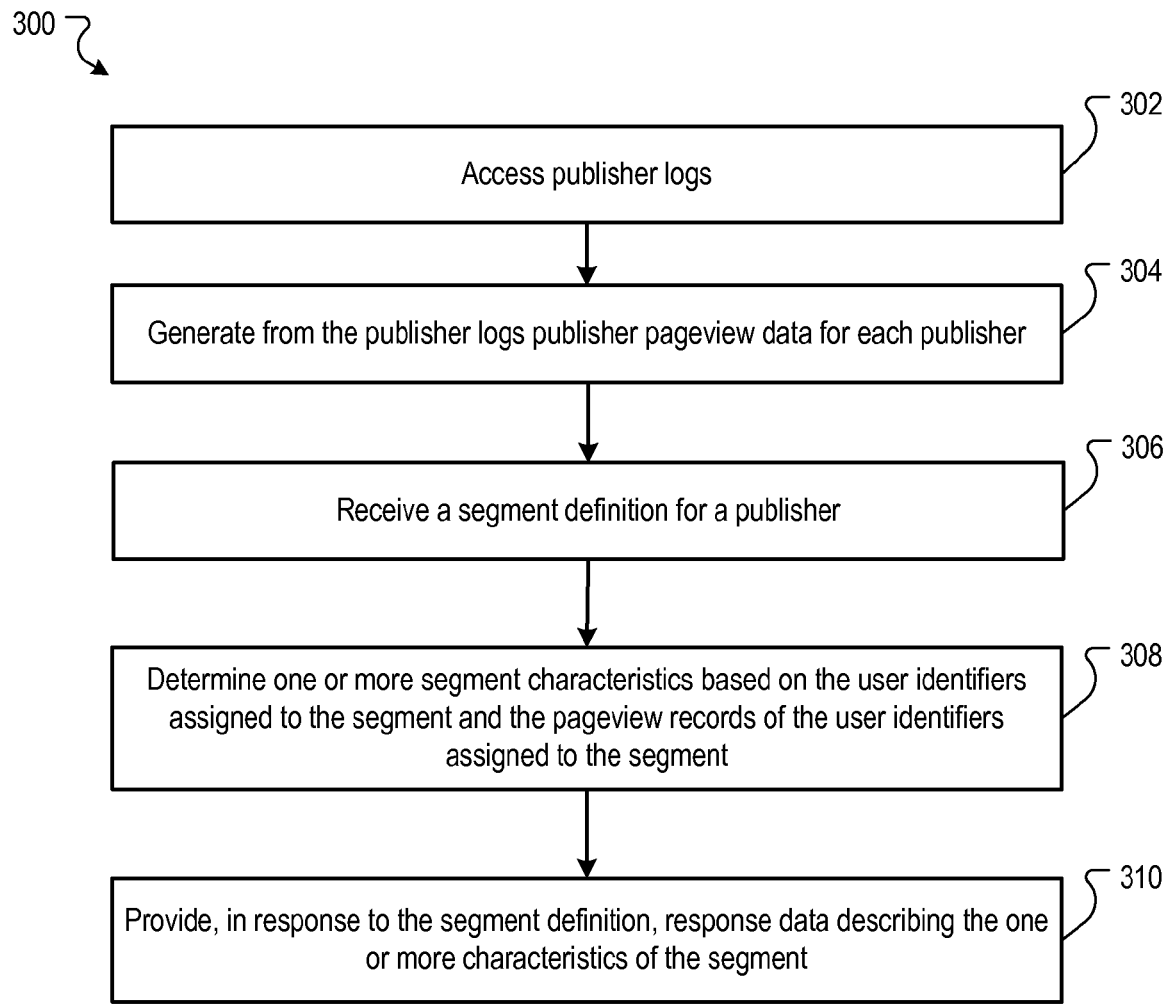
FIG. 3 is a flow diagram of an example process of determining one or more characteristics of a segment.

FIG. 3 is a flow diagram of an example process 300 of determining one or more characteristics of a segment. The process 300 can be implemented in the segment estimation system 100 of FIG. 1.

The process 300 accesses publisher logs (302). For example, the scanner 104 accesses publisher logs 80. The publisher logs 80 store data describing past impressions delivered for pageviews of particular publisher sites. Particularly, the publisher logs 80 may store impression data and pageview data. For each impression in the logs 80, the data may include a user identifier, a publisher identifier, a pageview value, and any number of publisher key values of the publisher provided for the impression.

The process 300 generates from the publisher logs publisher pageview data for each publisher (302). For example, the scanner generates the publisher records 116 from the publisher logs, and the aggregator 106 generates pageview data for each publisher from the publisher records 116. The publisher pageview data can, for example, include pageview records representative of pageviews that occurred during a first time period, such as a one month time period. Each pageview record in the one month period may represent one or more pageviews associated with a user identifier and a publisher identifier pair during a second time period (e.g., a day) that occurred during the month. Each pageview record represented within the one day time period includes a specific user identifier, a publisher identifier, and publisher key values provided for the impressions that occurred for the one or more pageviews. Although the example time periods of one month and one day are used, the process 300 can generate pageview records for different time periods.

The process 300 receives a segment definition for a publisher (306). For example, the segment management engine 102 receives a segment definition for a publisher. The segment definition defines a segment by one or more publisher key values of the publisher. The segment definition can also include a minimum (or maximum) pageview definition defining a number of pageviews and a minimum (or maximum) time period in which the pageviews occurred. The segment estimator assigns to the segment user identifiers from records that include publisher key values that satisfy the segment defined by the segment definition.

The process 300 determines one or more segment characteristics based on the user identifiers assigned to the segment and the pageview records of the user identifiers assigned to the segment (308). For example, the segment estimator 108 determines segment characteristics based on current users assigned to the segment. Determining segment characteristics may include determining a first number of pageviews from the pageview records available. The pageview records available may include records for user identifiers assigned to a particular segment. In some implementations, determining segment characteristics includes determining targeting criteria based on pageview records of specific user identifiers assigned to a segment.

The process 300 provides, in response to the segment definition, response data describing the one or more characteristics of the segment (310). For example, the segment management engine 102 uses the segment definition to determine and provide response data regarding segment characteristics. In one example, the response data may be provided to an advertisement management system to facilitate advertisement targeting for future pageviews associated with specific user identifiers assigned to a segment.

Figure 4:
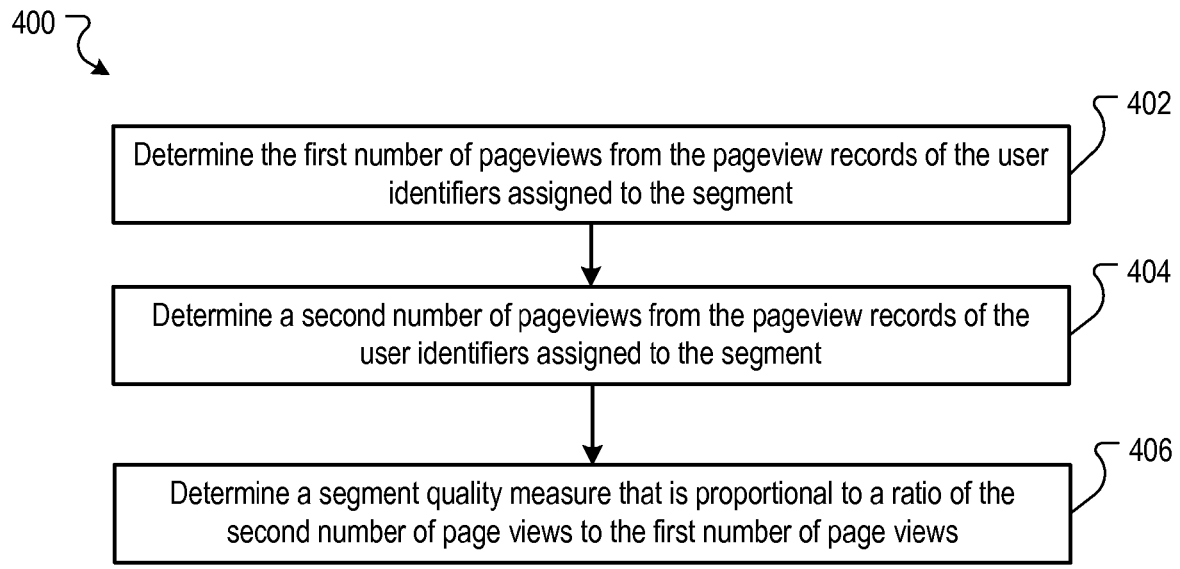
FIG. 4 is a flow diagram of an example process of determining a segment quality measure.

FIG. 4 is a flow diagram of an example process 400 of determining a segment quality measure. The process 400 can, for example, be implemented in the segment estimator 108.

The process 400 determines a first number of pageviews from the pageview records of the user identifiers assigned to the segment (402). For example, the segment estimator 108 determines which pageview/key value maps in pageview data 114 indicate publisher key values that satisfy the segment definition. From this information, a total number of in-segment pageviews are generated, i.e., pageviews that include key values that satisfy the segment definition.

The process 400 determines a second number of pageviews from the pageview records of the user identifiers assigned to the segment (404). For example, the segment estimator 108 determines a total number of pageviews represented by the pageview records of the user identifiers assigned to the segment, i.e., both in-segment and out-of-segment pageviews for the user, which, in some implementations, are all pageviews associated with the user identifier belonging to the segment.

The process 400 determines a segment quality measure that is proportional to a ratio of the second number of pageviews to the first number of pageviews (406). For example, the segment estimator 108 uses the first number of pageviews and the second number of pageviews to calculate a segment quality measure. In some implementations, the quality measure may be a measurement of the sum of in-segment and out-of-segment pageviews to the number of in-segment pageviews.

Figure 5:
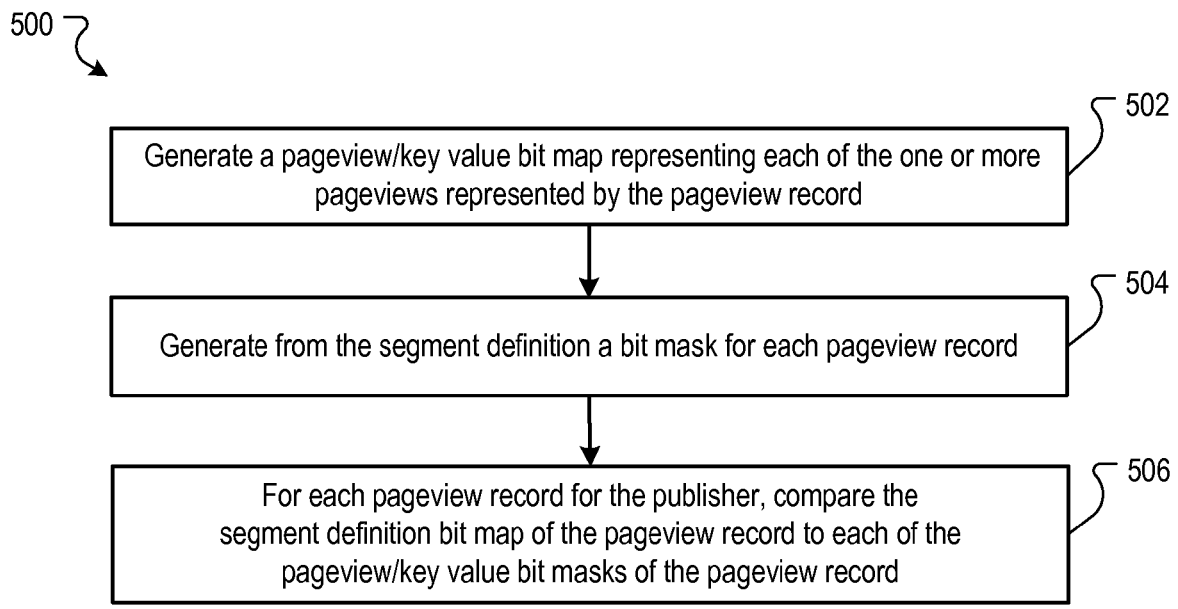
FIG. 5 is a flow diagram of an example process of determining pageviews that satisfy a segment definition.

FIG. 5 is a flow diagram of an example process 500 of determining pageviews that satisfy a segment definition. The process 500 can, for example, be implemented in the aggregator 106 or the segment estimator 108.

The process 500 generates a pageview/key value bit map representing each of the one or more pageview represented by the pageview record (502). For example, the aggregator 106 generates bit maps to represent pageviews in a pageview record. In operation, for each pageview record, the publisher key values are stored in respective fields in the pageview record. Each field is associated with a respective index value.

As detailed in FIG. 2, the pageview/key value bit map includes a first value in an indexed position corresponding to a respective index value of a publisher key value that was provided for an impression for the pageview. In addition, the bit map includes a second value in an indexed position corresponding to a respective index value of a publisher key value that was not provided for the impression for the pageview.

The process 500 generates a bit mask for each pageview record from the segment definition (504). For example, the segment estimator 108 generates one or more bit masks for each pageview record using the segment definition. Depending on the complexity of the segment definition, only one bit mask for a pageview record may need to be generated, or, for complex definitions, multiple bit masks may need to be generated for each pageview record. In one example, each bit mask includes a first value in an indexed position that corresponds to a respective index value of a publisher key value in the segment definition. In addition, the bit mask may include a second key value in an indexed position corresponding to the respective index value of a publisher key value not in the segment definition.

For each pageview record for the publisher, the process 500 compares the segment definition bit mask(s) of the pageview record to each of the pageview/key value bit maps of the pageview record (506). For example, the segment estimator 108 performs a comparison of the segment definition bit mask and the pageview/key value bit map. If the segment definition bit mask of the pageview record matches one of the pageview/key value bit maps of the record, and the corresponding comparison of the bit map and bit masks generates a Boolean true value, then the user identified in the record may be counted as a segment member.

Figure 6:
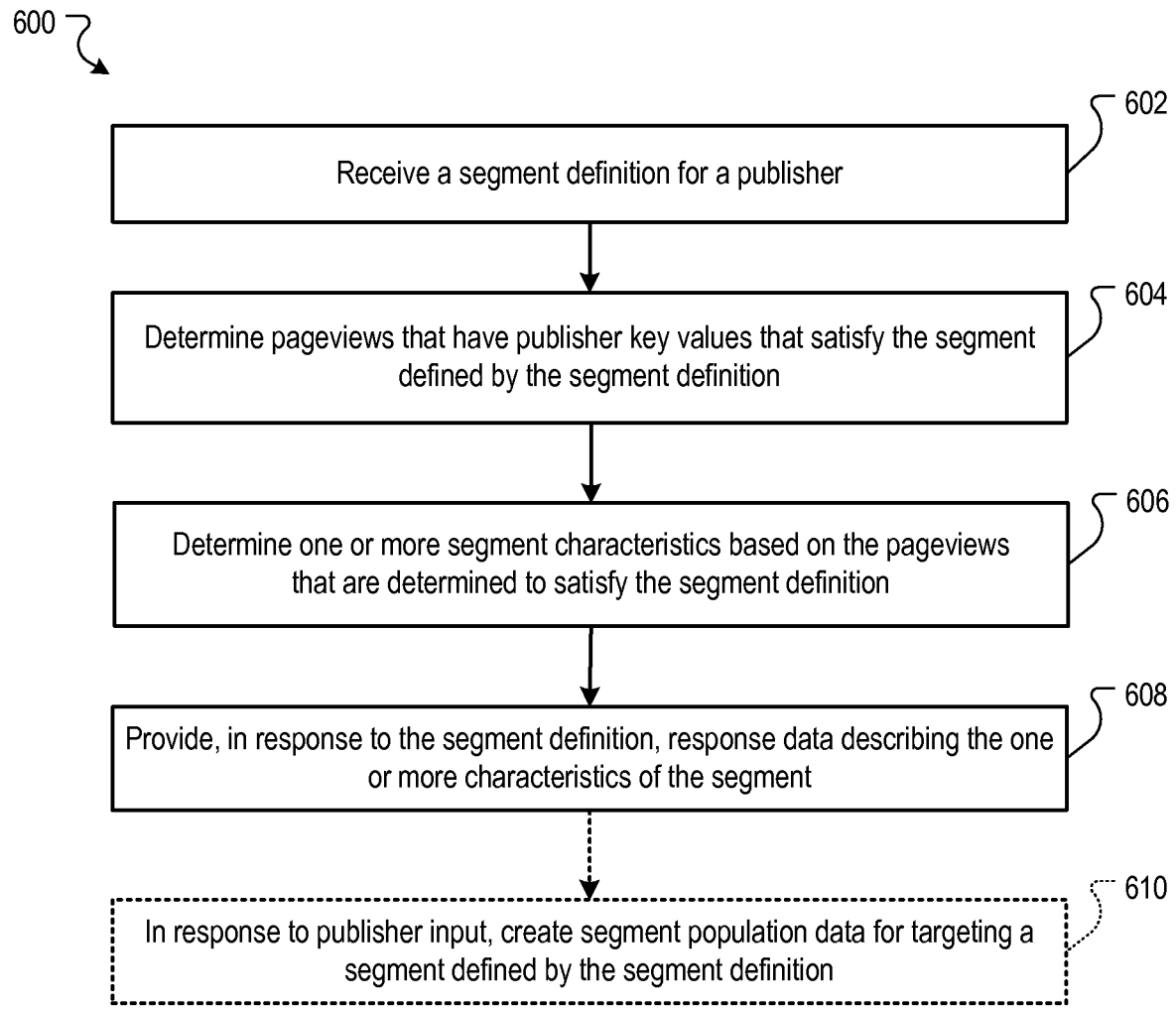
FIG. 6 is a flow diagram of another example process of determining one or more characteristics of a segment.

FIG. 6 is a flow diagram of another example process 600 of determining one or more characteristics of a segment. The process 600 can, for example, be implemented in the segment management engine 102 or the segment estimator 108, or a combination or both.

The process 600 receives a segment definition for a publisher (602). For example, the segment management engine 102 receives a segment definition for a particular publisher that defines a segment by one or more key values. The key values pertain to each individual publisher, and as such, can be defined by each publisher.

The process 600 determines pageviews that have publisher key values that satisfy the segment defined by the segment definition (604). For example, the segment estimator 108 determines pageviews having key values that match the key values required for inclusion in a segment defined by a segment definition.

The process 600 determines one or more segment characteristics based on the pageviews that are determined to satisfy the segment definition (606). For example, the segment estimator 108 determines segment characteristics of pageview data 114 based pageviews that are predetermined to satisfy the segment definition.

The process 600 provides, in response to the segment definition, response data describing the one or more characteristics of the segment (608). For example, the segment management engine 102 provides response data 112. The response data 112 describes the characteristics of each segment.

The process 600, in response to publisher input, creates segment population data for targeting a segment defined by the segment definition (610). For example, the segment management engine 102 can create an association of user identifiers and data defining the segment. The advertisement management system 74 or the requesting publisher 60 can use the segment population data 113 to target advertisements for future pageviews associated with the user identifiers assigned to the segment, or, in some implementations, with any other users that are determined to belong to the segment when the users visit a particular publisher's site.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and an apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   accessing, by a data processing apparatus, publisher logs including data describing past impressions delivered for pageviews for publisher sites;
   generating, by the data processing apparatus, from the publisher logs publisher pageview data for each publisher site, the publisher pageview data for each publisher site specifying pageviews that occurred during a first time period and including pageview records, each pageview record representing one or more pageviews associated with a user identifier a during a second time period that occurred during the first time period;
   receiving, at the data processing apparatus, a segment definition for a publisher site, the segment definition defining a segment by one or more publisher key values of the publisher;
   assigning, by the data processing apparatus, to the segment user identifiers that satisfy the segment defined by the segment definition;
   determining a first number of pageviews from the pageview records of the user identifiers assigned to the segment, the first number of pageviews equal to the number of pageviews associated with publisher key values provided for an impression that satisfy the segment definition;
   determining a second number of pageviews from the pageview records of the user identifiers assigned to the segment, the second number of pageviews equal to the total number of pageviews represented by the pageview records of the user identifiers assigned to the segment;
   determining a segment quality measure for the segment that is proportional to a ratio of the second number of pageviews to the first number of pageviews; and
   providing, in response to the segment definition, response data describing the segment quality measure for the segment.

2. The computer-implemented method of claim 1, wherein each pageview record includes, for each pageview the pageview record represents, a pageview/key value map that indicates which of the publisher key values were provided for impressions for the pageview.

3. The computer-implemented of claim 2, wherein:
   determining the first number of pageviews from the pageview records of the user identifiers assigned to the segment comprise determining the number pageview/key value maps that indicate publisher key values that satisfy the segment definition.

4. The computer-implemented method of claim 3, further comprising:
   generating segment population data, the segment population data being an association of user identifiers assigned to the segment defined by the segment definition data and data defining the segment; and
   providing, in response to the segment definition, the segment population data to a publisher to facilitate advertisement targeting for future pageviews associated with the user identifiers assigned to the segment.

5. A system, comprising:
   a data processing apparatus; and
   a memory storage system in data communication with the data processing apparatus and storing instructions executable by the data processing apparatus and that upon such execution cause the data processing apparatus to perform operations comprising:
   accessing publisher logs including data describing past impressions delivered for pageviews for publisher sites;
   generating from the publisher logs publisher pageview data for each publisher site, the publisher pageview data for each publisher site specifying pageviews that occurred during a first time period and including pageview records, each pageview record representing one or more pageviews associated with a user identifier a during a second time period that occurred during the first time period;
   receiving a segment definition for a publisher site, the segment definition defining a segment by one or more publisher key values of the publisher;
   assigning to the segment user identifiers that satisfy the segment defined by the segment definition;
   determining a first number of pageviews from the pageview records of the user identifiers assigned to the segment, the first number of pageviews equal to the number of pageviews associated with publisher key values provided for an impression that satisfy the segment definition;
   determining a second number of pageviews from the pageview records of the user identifiers assigned to the segment, the second number of pageviews equal to the total number of pageviews represented by the pageview records of the user identifiers assigned to the segment;

determining a segment quality measure for the segment that is proportional to a ratio of the second number of pageviews to the first number of pageviews; and providing, in response to the segment definition, response data describing the segment quality measure for the segment.

6. The system of claim 5, wherein each pageview record includes, for each pageview the pageview record represents, a pageview/key value map that indicates which of the publisher key values were provided for impressions for the pageview.

7. The system of claim 5, wherein the operation of determining the first number of pageviews from the pageview records of the user identifiers assigned to the segment comprise determining the number pageview/key value maps that indicate publisher key values that satisfy the segment definition.

8. The system of claim 5, wherein the operations further comprise:

generating segment population data, the segment population data being an association of user identifiers assigned to the segment defined by the segment definition data and data defining the segment; and providing, in response to the segment definition, the segment population data to a publisher to facilitate advertisement targeting for future pageviews associated with the user identifiers assigned to the segment.

9. A memory storage device storing instructions executable by a data processing apparatus and that upon such execution cause the data processing apparatus to perform operations comprising:

accessing publisher logs including data describing past impressions delivered for pageviews for publisher sites;

generating from the publisher logs publisher pageview data for each publisher site, the publisher pageview data for each publisher site specifying pageviews that occurred during a first time period and including pageview records, each pageview record representing one or more pageviews associated with a user identifier a during a second time period that occurred during the first time period;

receiving a segment definition for a publisher site, the segment definition defining a segment by one or more publisher key values of the publisher;

assigning to the segment user identifiers that satisfy the segment defined by the segment definition;

determining a first number of pageviews from the pageview records of the user identifiers assigned to the segment, the first number of pageviews equal to the number of pageviews associated with publisher key values provided for an impression that satisfy the segment definition;

determining a second number of pageviews from the pageview records of the user identifiers assigned to the segment, the second number of pageviews equal to the total number of pageviews represented by the pageview records of the user identifiers assigned to the segment;

determining a segment quality measure for the segment that is proportional to a ratio of the second number of pageviews to the first number of pageviews; and providing, in response to the segment definition, response data describing the segment quality measure for the segment.

10. The memory storage device of claim 9, wherein each pageview record includes, for each pageview the pageview record represents, a pageview/key value map that indicates which of the publisher key values were provided for impressions for the pageview.

11. The memory storage device of claim 10, wherein the operation of determining the first number of pageviews from the pageview records of the user identifiers assigned to the segment comprise determining the number pageview/key value maps that indicate publisher key values that satisfy the segment definition.

12. The memory store device of claim 11, wherein the operations further comprise:

generating segment population data, the segment population data being an association of user identifiers assigned to the segment defined by the segment definition data and data defining the segment; and providing, in response to the segment definition, the segment population data to a publisher to facilitate advertisement targeting for future pageviews associated with the user identifiers assigned to the segment.

* * * * *

UNITED STATES PATENT AND TRADEMARK OFFICE
CERTIFICATE OF CORRECTION

PATENT NO. : 8,639,575 B2
APPLICATION NO. : 13/731560
DATED : January 28, 2014
INVENTOR(S) : Raimondas Kiveris Page 1 of 1

It is certified that error appears in the above-identified patent and that said Letters Patent is hereby corrected as shown below:

In the Claims

Claim 1, Column 15, Line 51 – after "identifier" delete "a".

Claim 3, Column 16, Line 16 – delete "of" and insert -- method of --, therefor.

Claim 3, Column 16, Line 19 – delete "number" and insert -- number of --, therefor.

Claim 5, Column 16, Line 49 – after "identifier" delete "a".

Claim 7, Column 17, Line 13 – delete "number" and insert -- number of --, therefor.

Claim 9, Column 17, Line 37 – after "identifier" delete "a".

Claim 11, Column 18, Line 29 – delete "number" and insert -- number of --, therefor.

Claim 12, Column 18, Line 32 – delete "memory store" and insert -- memory storage --, therefor.

Signed and Sealed this
Seventeenth Day of June, 2014

Michelle K. Lee
*Deputy Director of the United States Patent and Trademark Office*